(12) United States Patent
Janus et al.

(10) Patent No.: US 7,568,980 B1
(45) Date of Patent: Aug. 4, 2009

(54) NATURAL SURFACE GOLF MAT

(76) Inventors: Ronald E. Janus, 15880-300 Summerlin Rd., S-166, Fort Myers, FL (US) 33908; Scott R. Janus, 15880-300 Summerlin Rd., S-166, Fort Myers, FL (US) 33908

( * ) Notice: Subject to any disclaimer, the term of this patent is extended or adjusted under 35 U.S.C. 154(b) by 0 days.

(21) Appl. No.: 12/002,898

(22) Filed: Dec. 19, 2007

(51) Int. Cl.
*A63B 69/36* (2006.01)
(52) U.S. Cl. ...................... 473/278; 473/279
(58) Field of Classification Search ........... 473/262, 473/278, 279; 47/65.9; 56/6
See application file for complete search history.

(56) References Cited

U.S. PATENT DOCUMENTS

| | | | | | |
|---|---|---|---|---|---|
| 2,134,647 | A | * | 10/1938 | Savage | 47/65.9 |
| 4,058,930 | A | * | 11/1977 | Miles | 47/58.1 R |
| 4,630,828 | A | * | 12/1986 | Lovin | 473/158 |
| 4,926,586 | A | * | 5/1990 | Nagamatsu | 47/65.9 |
| 5,309,846 | A | * | 5/1994 | Peterson | 108/53.3 |
| 5,653,551 | A | * | 8/1997 | Seaux | 404/35 |
| 5,673,513 | A | * | 10/1997 | Casimaty | 47/65.9 |
| 5,803,820 | A | * | 9/1998 | McCarty | 473/173 |
| 6,237,285 | B1 | * | 5/2001 | Yoshida et al. | 47/65.9 |
| 6,334,275 | B1 | * | 1/2002 | Egan | 47/56 |
| 7,210,876 | B2 | * | 5/2007 | Moralez et al. | 404/36 |
| 2006/0242901 | A1 | * | 11/2006 | Casimaty et al. | 47/65.9 |

* cited by examiner

*Primary Examiner*—Nini Legesse
(74) *Attorney, Agent, or Firm*—William E. Noonan

(57) ABSTRACT

A golf mat having upstanding side walls and a bottom made of a flexible material to enable the same to be rolled up. The mat can be filled with grass sod to present an upper natural playing surface for practicing golf shots. The side walls can be extended upwardly and the mat filled with sand to present a different, but natural playing surface to a golfer practicing sand shots.

8 Claims, 4 Drawing Sheets

NATURAL SURFACE GOLF MAT

FIELD OF THE INVENTION

This invention relates to a natural surface golf mat and, more particularly, to a golf mat that accommodates either a piece of natural sod or sand for practicing golf shots.

BACKGROUND OF THE INVENTION

Golf is a multi-billion dollar industry that attracts the interest of people throughout the world. This is one sport that can be enjoyed by anyone, anywhere and at any time. The one problem that golf enthusiasts face is their inability to practice on a regular basis. Of course, there are many golf courses or driving ranges and, as a last resort, one's backyard to practice. The latter, however, is not conducive to long drives, putting or sand trap shots.

The golf course is where a golfer is to excel, perform well and demonstrate skills that were honed through hours of practice. The golf range is a place to practice but, very often, a golfer is teeing off from an artificial mat which doesn't allow the golfer to duplicate the feel of natural grass under his or her feet and the same feel of hitting a golf ball on a natural grass playing surface. Another problem arises when practice shots are taken on natural grass. After a multitude of golfers have teed off from the same spot on the golf course or the driving range, that spot is apt to deteriorate badly. This can result in poor play, especially by golfers who follow previous players.

SUMMARY OF THE INVENTION

The inventive way of duplicating natural and undisturbed conditions to hit a golf ball from is the use of a mat that duplicates the exact conditions that one expects from a well tended golf course. The base mat is made of a hard but flexible material such as polyurethane, rubber or various other plastics or polymer based materials so that it can easily be rolled up and stored in the trunk of a car or golf cart. The mat has upstanding walls to receive grass plugs or sod therein, which then will represent a proper playing surface. The bottom of the mat has upstanding pins or spikes to aid in keeping the grass plugs or sod in their proper place or alignment. The mat can also be used to place sand therein to simulate playing out of a sand trap. The golf mat can be used in many practice areas other than a golf course or a driving range. Such practice areas could be open fields, parking areas when not in use, one way streets or school stadiums, when not in use. The mat is also quite convenient to use in the backyard, driveway or large indoor room of a home.

DETAILED DESCRIPTION OF PREFERRED EMBODIMENTS

Other objects, features and advantages will occur from the following description of a preferred embodiment and the accompanying drawings, in which.

Figure 1:
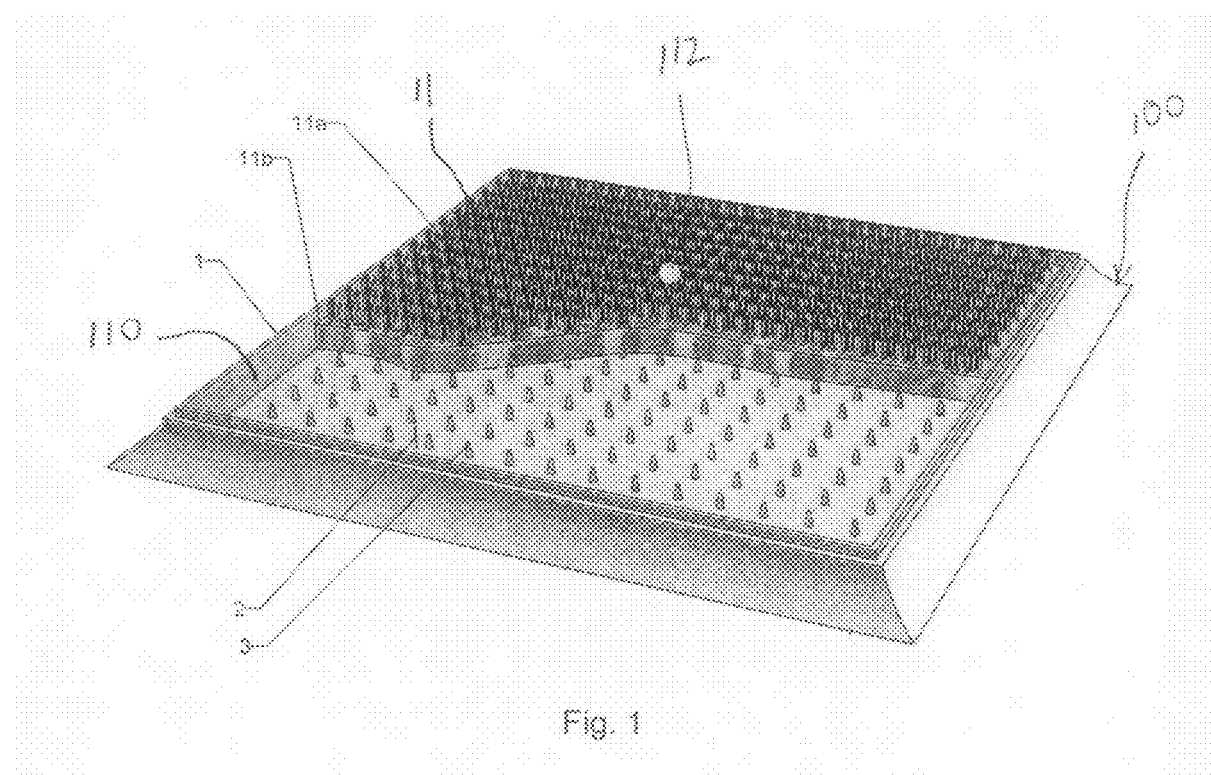
FIG. 1 is a perspective view of a preferred embodiment of the golf mat of this invention with a cut-away piece of natural turf received therein.
Figure 2:
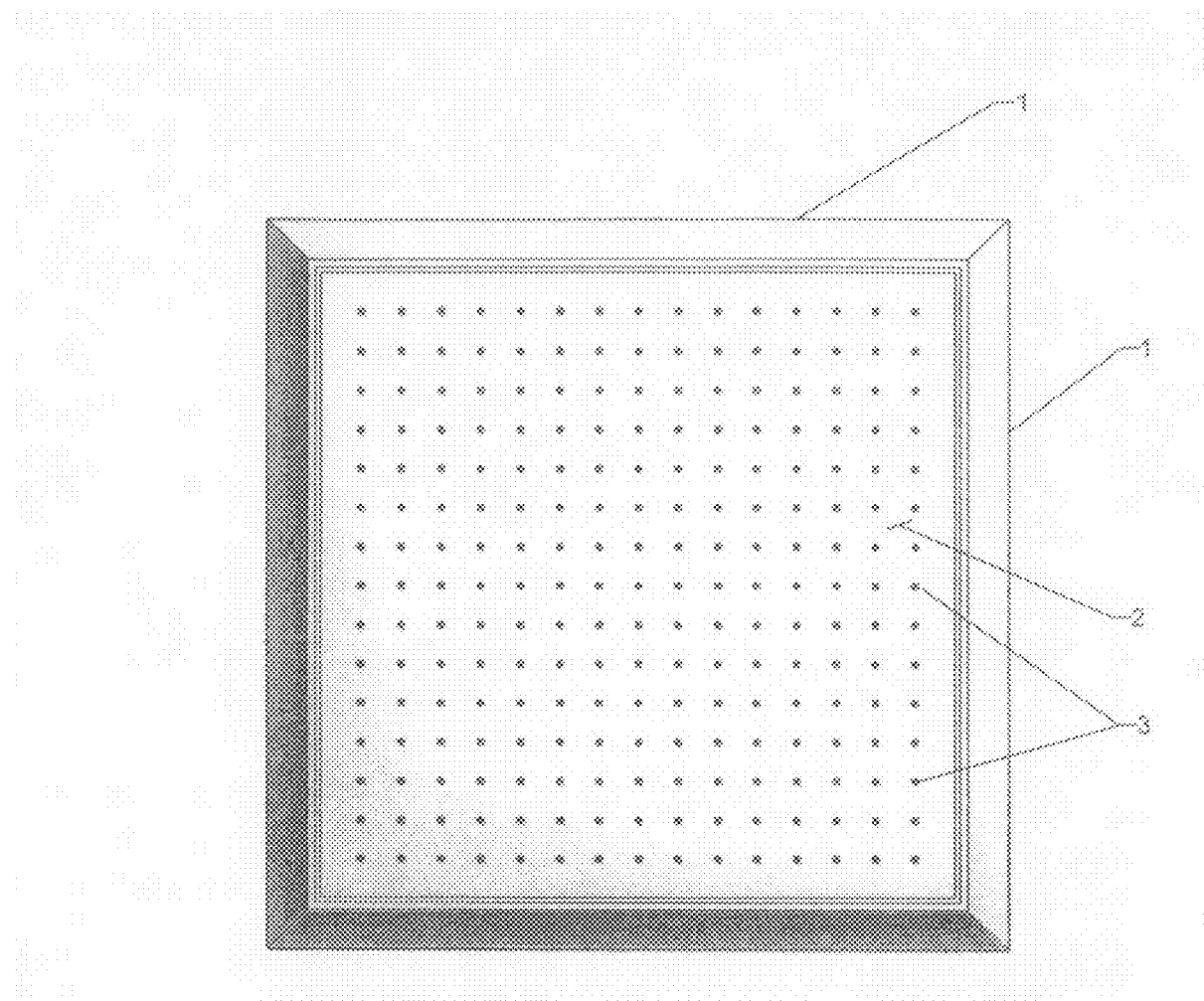
FIG. 2 is a top plan view of the preferred mat.

FIGS. 1 and 2 illustrate the golf mat 100 of this invention. The mat is intended for use in practicing golf shots in various locations. As shown, the outline of the mat can be square and the size should be determined so that the rolled-up mat could fit into a trunk or back seat of a car. It appears that a five foot square would be sufficient for any sized player to stand upon sod accommodated by the mat and comfortably practice various shots. Alternative sizes and configurations may be utilized. Preferably, the mat is composed of a durable, yet flexible material such as polyurethane and/or rubber. Various plastics/polymers may be used.

More particularly, mat 100 includes a generally planar bottom section 2 and a plurality of side walls 1 that extend upwardly from the bottom section to peripherally define the mat. The side walls surround, and together with bottom section 2 define, an interior compartment 110 that receives a correspondingly shaped (e.g. square) piece of sod or turf 11, a fragmented section of which is depicted in FIG. 1. Bottom section 2 has upstanding pins or spikes 3 embedded or otherwise formed thereon. The spikes 3 help to hold the sod 11 in place, especially the dirt base 11b of the sod that forms the bottom of the sod. When the mat is left outdoors for any length of time, rain or other watering will nurture the grass and the spikes 3 provide the necessary aeration. A golf ball is placed on the upper grass surface 11a of sod 11 and struck by a selected club during practice. The player stands on the sod within the boundaries of the mat to practice his or her swing.

Figure 3:
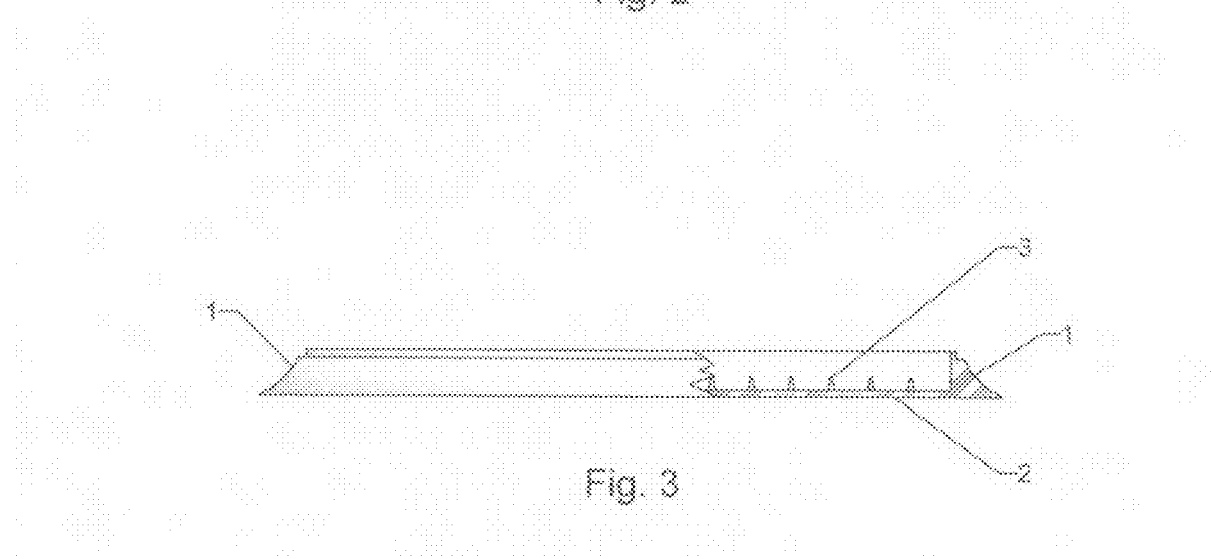
FIG. 3 is a side, partially cut-away view of the golf mat.

FIG. 3 shows the golf mat in a side view. The same reference characters have been applied as in FIGS. 1 and 2. This view further shows the profile of the side walls 1. Those walls feature a generally triangular cross sectional shape, with the outer side sloping downwardly. The slope helps a player avoid tripping on the side walls.

Figure 4:
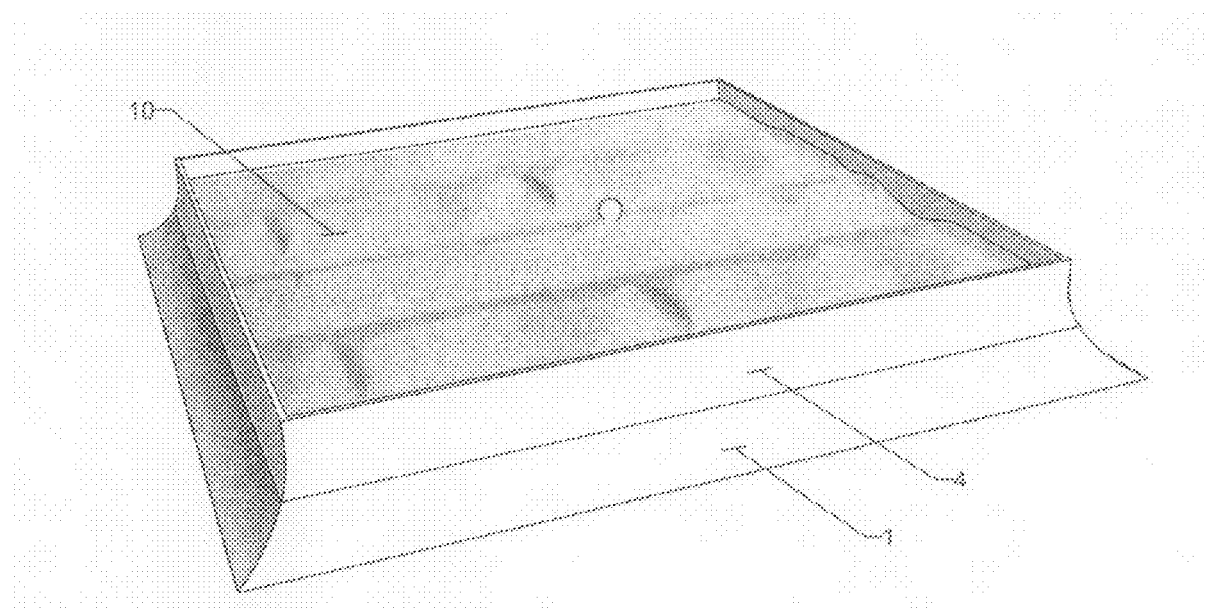
FIG. 4 is a perspective view of a golf mat in accordance with this invention having an upper extension thereon and being filled with sand.
Figure 5:
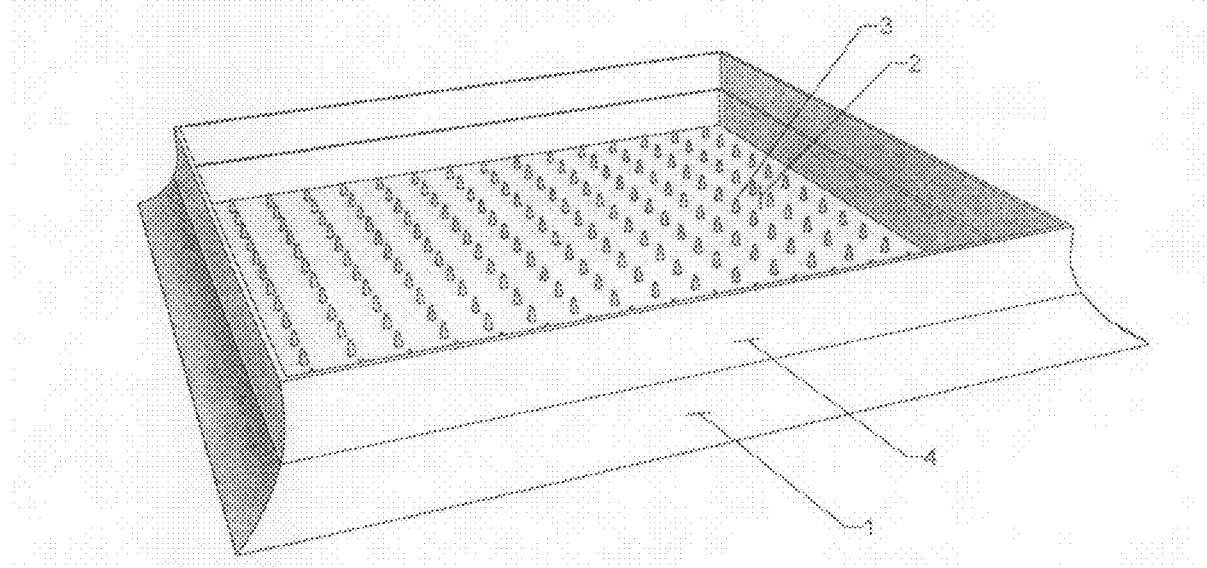
FIG. 5 shows the golf mat of FIG. 4 in a perspective view without the sand therein.

FIG. 4 illustrates the golf mat in a perspective view. Again, the same reference characters have been applied as were featured in the previous drawings. This view also shows an optionally attached extension 4, which extends above the upper margin of sides 1. This extension is used when a sand surface is utilized in combination with the golf mat. The sand surface can be seen at 10. Instead of sod or turf, sand fills the space defined by bottom 2 and side walls 1. Extension 4, which is composed of a material analogous to that used in the rest of mat 100, extends above the upper surface of sand 10. FIG. 4 depicts the mat of FIG. 4, but without any sand or natural grass therein.

Figure 6:
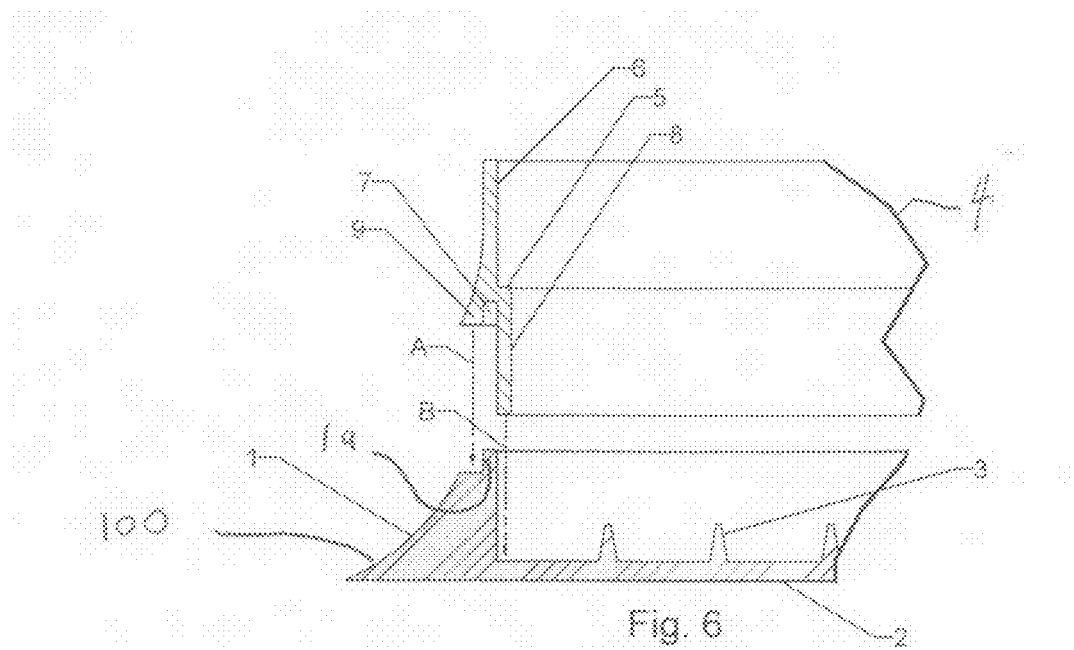
FIG. 6 is the extension prior to being installed in the bottom of the mat.

FIG. 6 is a cross sectional view of the mat and the upper extension. Again, the same reference characters are applied from previous drawings. The bottom of the mat can be seen at 2 and the sloping side walls at 1. This illustration in FIG. 6 shows the extension 4 prior to being inserted into mat 100. Extension 4 includes a downwardly extending segment that slides downwardly into the mat, as shown by arrow A, and settles against the inner side wall of the base frame. An offset 5 unitarily connects extension 8 to an upper extension segment shown at 6. A curved lateral extension 9 is attached to the lower end of extension segment 6 and a receptacle 7 extends peripherally about extension piece 4 adjacent lateral extension 9. Sand accommodating extension 4 is slid downwardly (arrow A) to slide receptacle 7 over the narrow extension 1a and the curved lateral extension 9 completes the slope of the tapered side wall 1 once the upper extension 6 is settled on the side wall 1 and on the offset 1b. This arrangement offers a rigid connection between the sides 1 and the downward extension 8.

Figure 7:
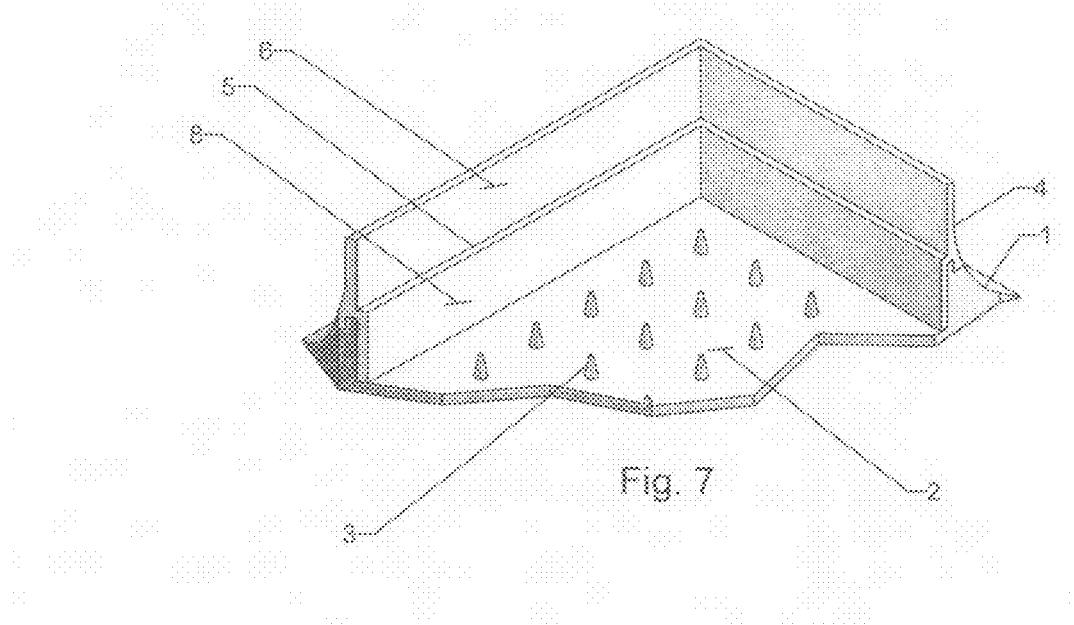
FIG. 7 is a perspective view of a corner of the golf mat with the extension thereon.
Figure 8:
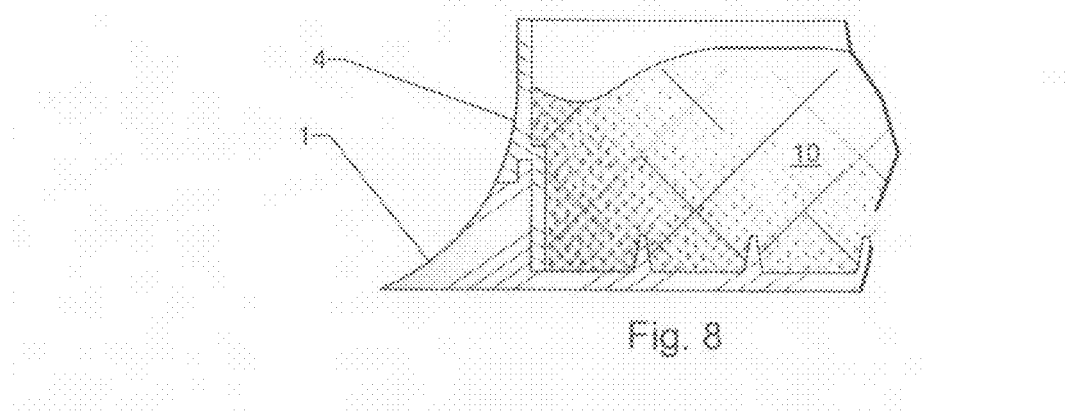
FIG. 8 is an elevational, cross sectional view of the mat after the extension has been installed.

FIG. 7 shows a perspective view of a corner of the golf mat with the extension 4 installed. FIG. 8 also shows the completed installation of the upper extension 4 onto side wall 1. Sand 10 has been added, which is securely retained by extension 4.

Accordingly, natural surface golf mat 100 allows golf shots to be practiced at various indoor and outdoor locations. The sod, turf or sand added to the mat duplicates real golf course conditions and provides the golfer with a very natural feel when striking the ball. Natural sod insert 11 can also be watered, fertilized, cut and otherwise cared for so that the grass sustains itself as in a natural golf course setting.

From the foregoing it may be seen that the apparatus of this invention provides for a natural surface golf mat. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims.

What is claimed is:

1. A golf mat and natural playing surface combination comprising:
   a mat that includes a generally planar bottom section and a side wall section that peripherally surrounds and extends upwardly from said bottom section; and
   a natural playing surface material selected from the group consisting of sod and sand which natural playing surface material is receivable generally conformably within an interior compartment of said mat defined by said bottom section and said side wall section for accommodating a golf ball thereon, whereby the golf ball may be struck while supported on said natural playing surface material by a person standing on said mat; said bottom section carrying a plurality of upwardly extending spikes for engaging securing and aerating sod received within said interior space of said mat and defining said natural playing surface material.

2. The apparatus of claim 1 in which said side wall has a generally right triangular cross sectional configuration with a sloped surface thereon facing outwardly from said interior space of said mat.

3. The apparatus of claim 1 further including a side wall extension that is attachable to and extendable upwardly from said side wall section to increase the height thereof.

4. The apparatus of claim 1 in which said extension includes an offset section that engages an upper margin of said side wall section when said side wall extension is attached to said side wall section.

5. The apparatus of claim 1 in which said compartment holds water to irrigate sod received within said compartment.

6. A method of assembling and using a natural playing surface golf mat comprising:
   providing a mat that includes a generally planar bottom section and a sidewall section that peripherally surrounds and extends upwardly from said bottom section;
   providing the bottom section of the mat with multiple spikes that extend upwardly therefrom;
   introducing into an interior compartment of said mat defined by said bottom section and said side wall section a natural playing surface material consisting of sod;
   engaging said sod with said spikes to secure said sod within the interior space of the mat and aerate the sod;
   placing a golf ball upon the natural playing surface material; and
   making a golf swing to strike the golf ball with a selected golf club.

7. The method of claim 6 further including the step of providing the side wall section with a right triangular cross sectional configuration having a sloped surface thereof facing outwardly from the interior face of the mat.

8. The method of claim 6 further including mounting a side wall extension to the side wall section of the mat such that the side wall extension extends upwardly from the side wall section to increase the peripheral height of the mat.

* * * * *